(12) United States Patent
Nakamura et al.

(10) Patent No.: US 12,130,201 B2
(45) Date of Patent: Oct. 29, 2024

(54) PRESSURE DETECTION DEVICE WITH DETACHABLE TEMPERATURE REDUCING BUFFER MEMBER

(71) Applicants: CITIZEN FINEDEVICE CO., LTD., Yamanashi (JP); CITIZEN WATCH CO., LTD., Nishitokyo (JP)

(72) Inventors: Yujiro Nakamura, Minamitsuru-gun (JP); Kazuo Takahashi, Minamitsuru-gun (JP); Motoki Obata, Minamitsuru-gun (JP); Hiroshi Nakagawa, Minamitsuru-gun (JP)

(73) Assignees: CITIZEN FINEDEVICE CO., LTD., Minamitsuru-gun (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 18/420,018

(22) Filed: Jan. 23, 2024

(65) Prior Publication Data
US 2024/0255382 A1    Aug. 1, 2024

(30) Foreign Application Priority Data

Jan. 30, 2023   (JP) ................................ 2023-012051

(51) Int. Cl.
*G01M 15/08*    (2006.01)
(52) U.S. Cl.
CPC ................................... *G01M 15/08* (2013.01)
(58) Field of Classification Search
CPC .... G01M 15/08; G01L 23/10; G01L 19/0645; G01L 23/22; G01L 23/28
See application file for complete search history.

(56) References Cited

U.S. PATENT DOCUMENTS

| | | | |
|---|---|---|---|
| 2010/0275696 A1 | 11/2010 | Kurtz et al. | |
| 2020/0271546 A1* | 8/2020 | Mohr | G01N 27/4162 |

FOREIGN PATENT DOCUMENTS

| | | | |
|---|---|---|---|
| GB | 501872 A | | 3/1939 |
| JP | S47-37665 Y1 | | 11/1972 |
| JP | H02-20128 U | | 2/1990 |
| JP | 2008-70212 A | | 3/2008 |
| JP | 2010-509574 A | | 3/2010 |
| JP | 2019-113382 A | | 7/2019 |
| JP | 2021056119 A | * | 4/2021 |

OTHER PUBLICATIONS

Feb. 14, 2023 Decision to Grant issued in Japanese Patent Application No. 2023-012051.
Jul. 5, 2024 Office Action issued in Japanese Patent Application No. 24153165.6.

* cited by examiner

*Primary Examiner* — Peter J Macchiarolo
*Assistant Examiner* — Timothy P Graves
(74) *Attorney, Agent, or Firm* — Oliff PLC

(57) ABSTRACT

A pressure detection device 1 includes: an enclosure assembly configured to be mounted in a communication hole in an internal combustion engine; a diaphragm head 32 provided at one end of the enclosure assembly and configured to receive pressure of combustion gas from the internal combustion engine; and a buffer member 80 located at the diaphragm head 32 and configured to supply the combustion gas to the diaphragm head 32 while reducing the temperature of the combustion gas. Female threads formed on a first buffer member 81 of the buffer member 80 and male threads formed on a second buffer member 82 of the buffer member 80 are configured to threadably engage each other.

11 Claims, 10 Drawing Sheets

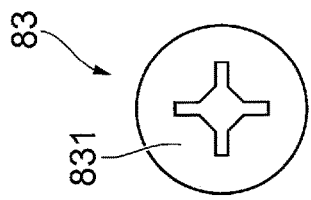 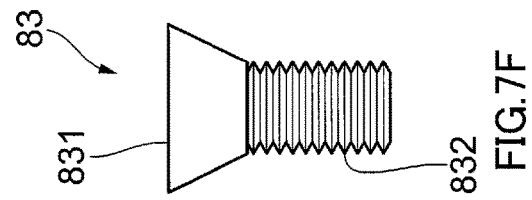
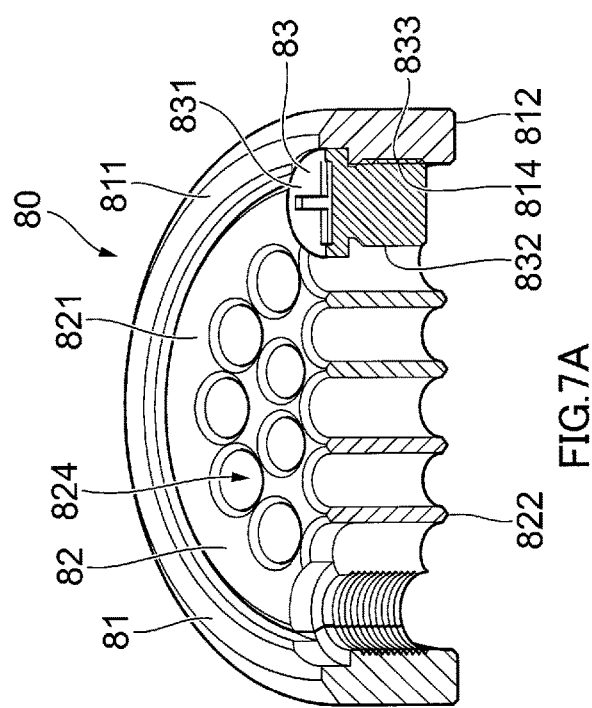 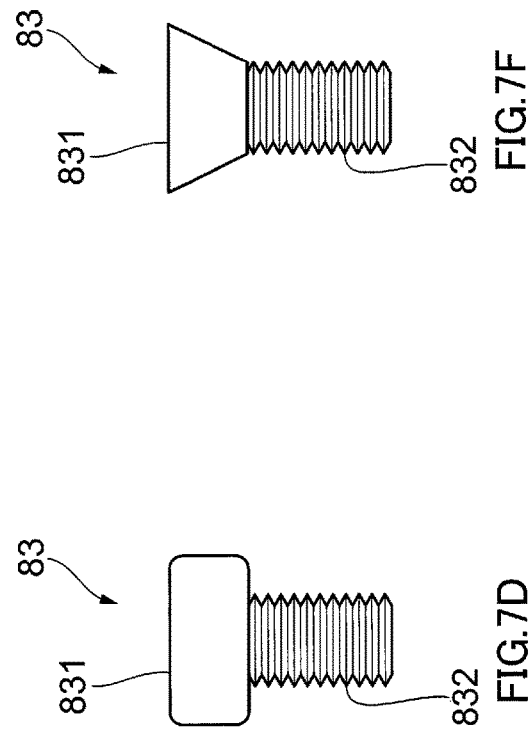

PRESSURE DETECTION DEVICE WITH DETACHABLE TEMPERATURE REDUCING BUFFER MEMBER

CROSS REFERENCE TO RELATED APPLICATIONS

This application is based on and claims priority under 35 USC § 119 to Japanese Patent Application No. 2023-012051 filed on Jan. 30, 2023, the disclosure of which is incorporated herein by reference in its entirety.

BACKGROUND

Technical Field

The present invention relates to a pressure detection device.

RELATED ART

A pressure detection device for detecting pressure of a fluid from an internal combustion engine is known (e.g., Japanese Patent Application Laid-Open Publication No. 2021-056119). After a certain period of use of such a device, incomplete combustion products accumulate on a temperature reducing member that reduces the temperature of the fluid and supplies it to a pressure receiving member. Since the accumulation of incomplete combustion products may inhibit accurate pressure measurement, it is necessary to periodically remove the incomplete combustion products adhering to the temperature reducing member.

SUMMARY

However, it is difficult to remove incomplete combustion products from the temperature reducing member when the temperature reducing member and the pressure receiving member are tightly connected by being joined together by laser welding etc. or by being integrally molded.

It is an object of certain embodiments of the present invention to enable easy removal of incomplete combustion products adhering to the temperature reducing member even when the temperature reducing member and the pressure receiving member are tightly connected.

With the above object in view, certain embodiments of the present invention provide a pressure detection device comprising: a body configured to be mounted in a hole in an internal combustion engine; a pressure receiving member provided at one end of the body and configured to receive pressure of a fluid from the internal combustion engine; and a temperature reducing member located at the pressure receiving member on a leading end at the one end of the body and configured to supply the fluid to the pressure receiving member while reducing temperature of the fluid. The pressure receiving member comprises: a pressure receiving portion configured to be displaced under pressure; and a pressure receiving support portion joined to or integrated with a first member, the first member being joined to or integrated with the pressure receiving member and having an inner circumferential surface. The temperature reducing member comprises: the first member; and a second member having an outer circumferential surface facing the inner circumferential surface. Female threads formed on the inner circumferential surface of the first member and male threads formed on the outer circumferential surface of the second member are configured to threadably engage each other.

The first member may be integrally molded with the pressure receiving support portion.

The second member may comprise a plurality of communication holes configured to allow the fluid to be supplied to the pressure receiving portion.

The second member threaded with the first member may be located at a position where the second member does not contact the pressure receiving member.

The pressure detection device may further comprise a securing mechanism configured to secure the second member threaded with the first member.

The securing mechanism may comprise a combination of a threaded hole formed in a threaded engagement portion between the first member and the second member and a screw configured to be threaded into the threaded hole.

The threaded hole may be formed in the axial direction of the first member and the second members, and the first member may comprise a cut-away portion configured to mate with a portion of a head of the screw threaded into the threaded hole.

The head of the screw may be of a cylindrical shape.

The threaded hole may be formed in a direction perpendicular to the axial direction of the first member and the second member.

The head of the screw threaded into the threaded hole may be configured not to protrude from an entrance of the threaded hole.

The second member may comprise at least one straight groove on a leading end surface thereof.

The second member may be configured to be separated into a plurality of sub-members and assembled from the plurality of separated sub-members.

Each of the separated multiple sub-members may comprise a recess and a protrusion used for mating during assembly.

Certain embodiments of the present invention enable easy removal of incomplete combustion products adhering to the temperature reducing member even when the temperature reducing member and the pressure receiving member are tightly connected.

BRIEF DESCRIPTION OF THE DRAWINGS

FIG. 7A is a cross-sectional perspective view of the buffer member of FIG. 6 taken in the radial direction;

FIG. 7B is a cross-sectional view of the buffer member of FIG. 6 taken in the radial direction;

FIGS. 7C through 7F illustrate variations in the shape of the head of the screw;

DETAILED DESCRIPTION

An exemplary embodiment of the present invention will now be described with reference to the drawings.
[Pressure Detection Device Configuration]

Figure 1:
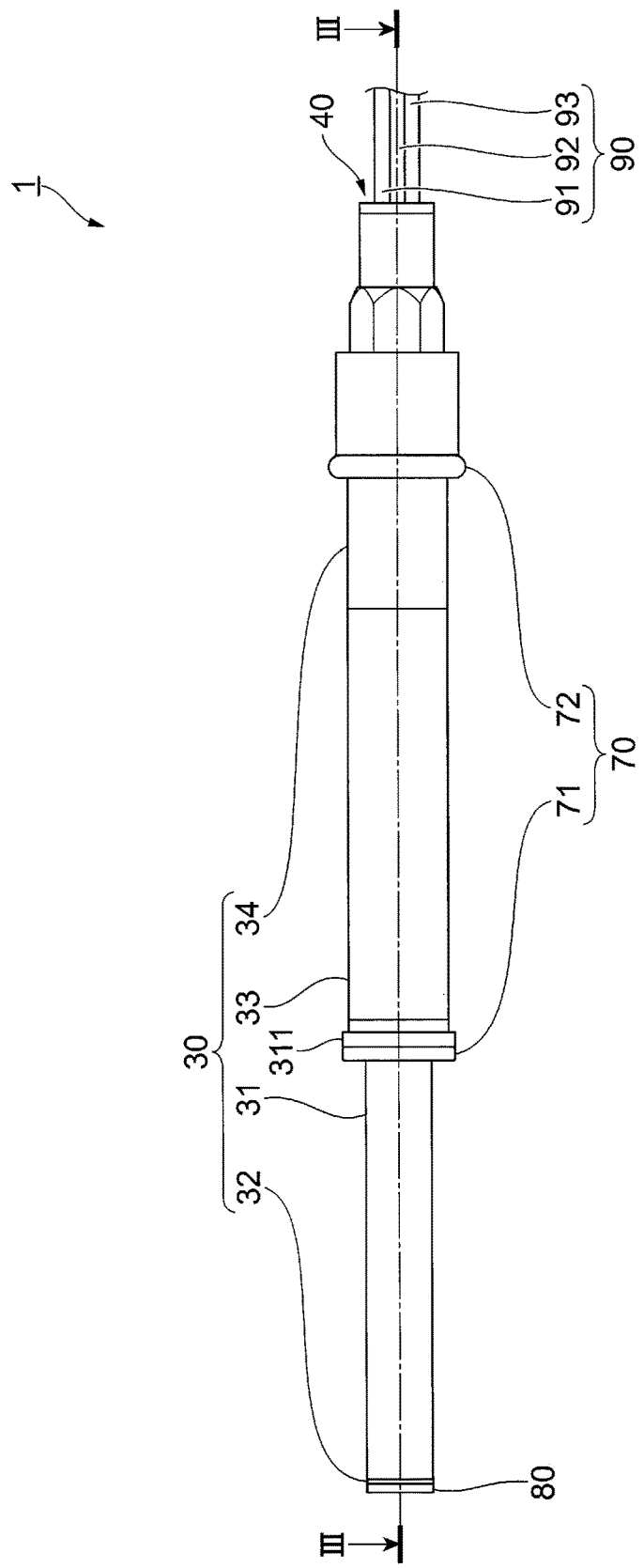
FIG. 1 is a side view of a pressure detection device according to an exemplary embodiment.
Figure 3:
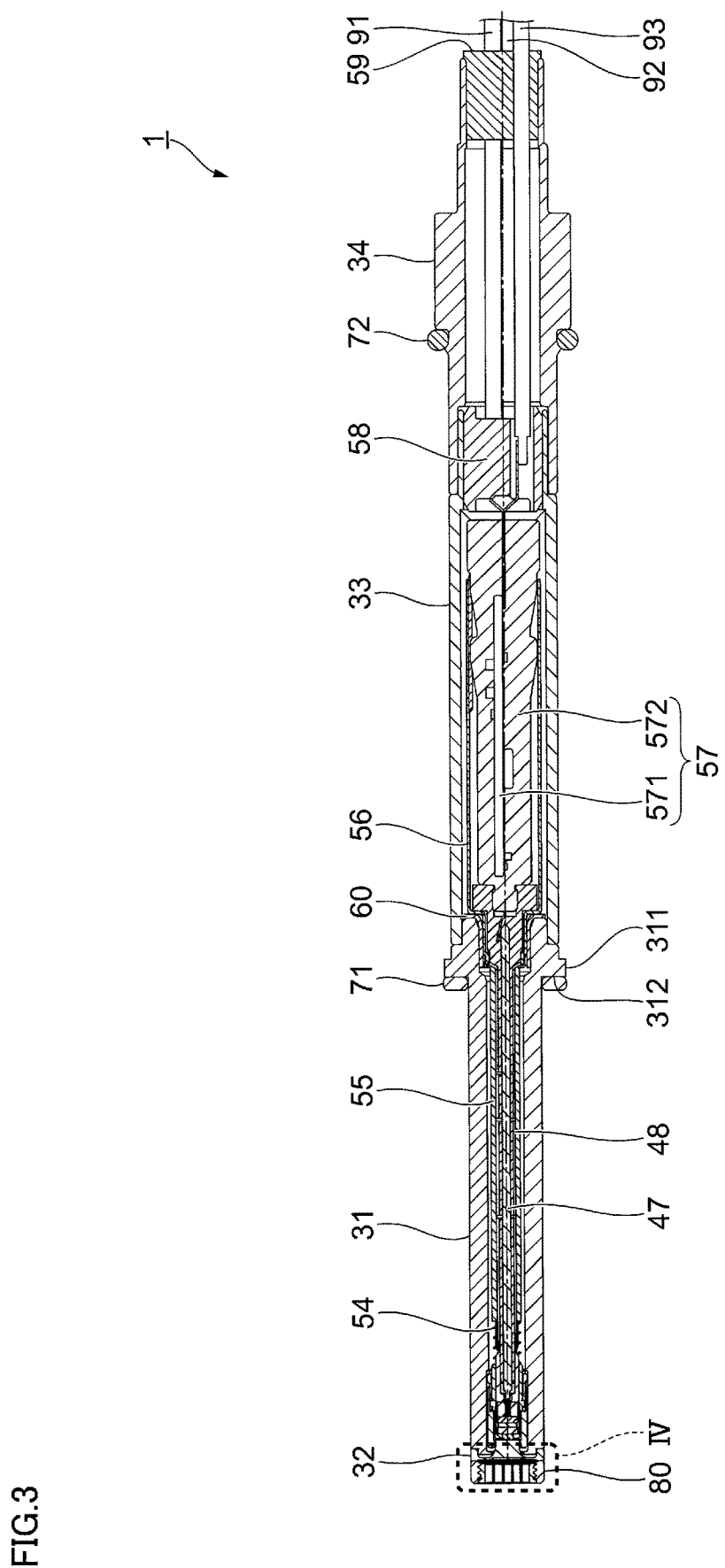
FIG. 3 is a cross-sectional view of the pressure detection device (taken along line III-III in FIG. 1)
Figure 4:
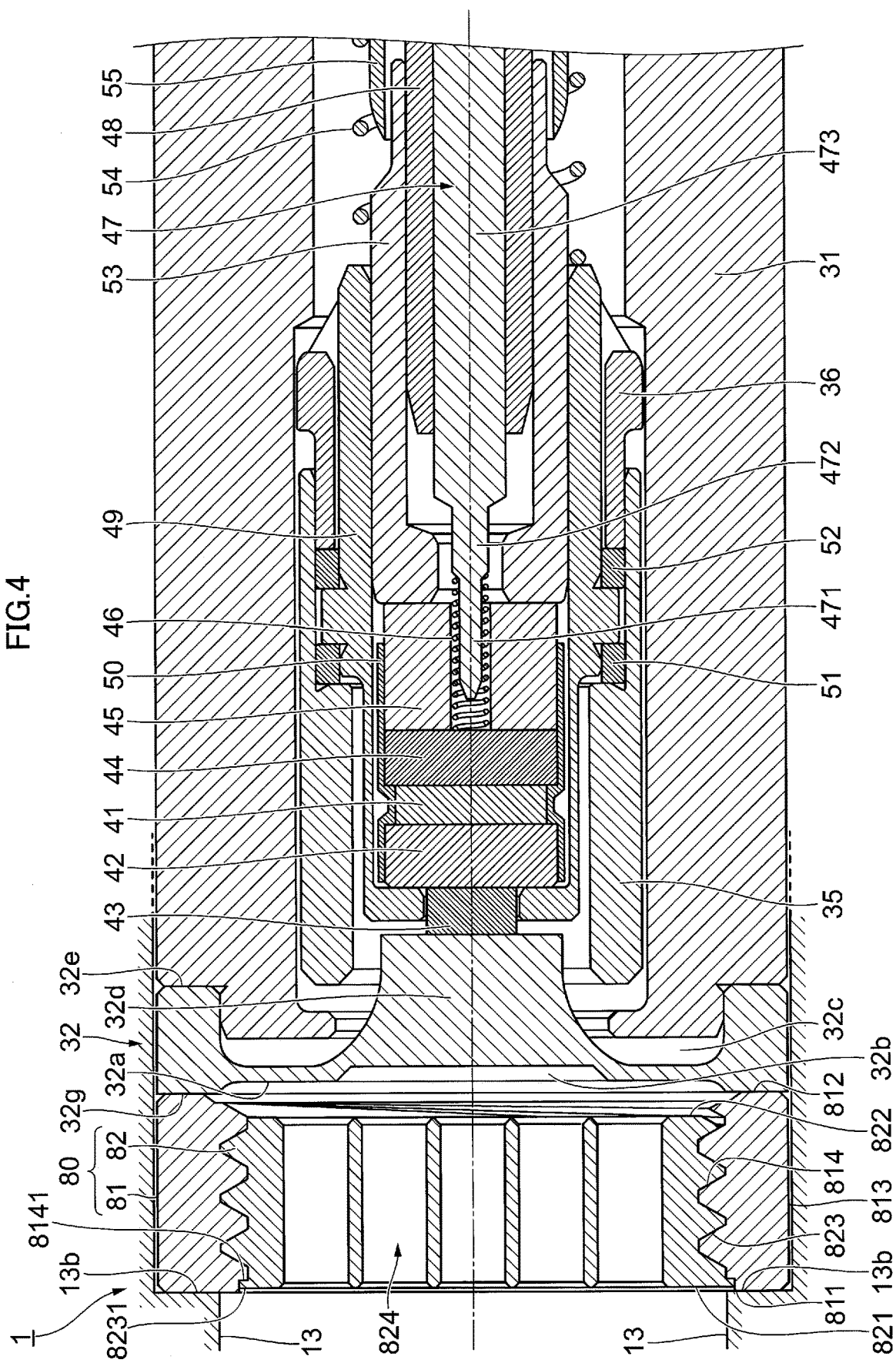
FIG. 4 is an enlarged cross-sectional view of a leading end of the pressure detection device 1 (region IV in FIG. 3)

FIG. 1 is a side view of a pressure detection device 1 according to an exemplary embodiment. FIG. 2A illustrates a schematic configuration of the pressure detection device 1 as mounted in an internal combustion engine 10, and FIG. 2B is an enlarged view of an area around a step 13b. FIG. 3 is a cross-sectional view of the pressure detection device 1 (taken along line III-III in FIG. 1). FIG. 4 is an enlarged cross-sectional view of a leading end of the pressure detection device 1 (region IV in FIG. 3).

The pressure detection device 1 according to the present embodiment is a device to detect pressure (combustion pressure) in a combustion chamber C in the internal combustion engine 10. In response to the pressure detection device 1 detecting pressure in the combustion chamber C, a controller (not shown) controls the operation of the internal combustion engine 10 based on the detected pressure. The pressure detection device 1 and the controller are electrically connected via a connecting cable 90.

The pressure detection device 1 includes an generally cylindrical enclosure assembly 30 exposed to the outside, a detection mechanism assembly 40 including various mechanisms for detecting pressure and housed in the enclosure assembly 30 in its substantial entirety with a portion thereof exposed to the outside, a sealing portion 70 attached to the outer circumference surface of the enclosure assembly 30, and a buffer member 80 attached to one end of the enclosure assembly 30 (left side of the enclosure assembly 30 in FIG. 1).

Here, the configuration of the internal combustion engine 10, which is subject to pressure detection by the pressure detection device 1, is described. The internal combustion engine 10 includes a cylinder block 11 with a cylinder formed therein, a piston 12 that reciprocates in the cylinder, and a cylinder head 13 that is fastened to the cylinder block 11 to constitute the combustion chamber C together with the piston 12 and other components. The cylinder head 13 includes a communication hole 13a providing communication of the combustion chamber C with the outside. The communication hole 13a includes a step 13c located in its intermediate position and a step 13b located closer to the combustion chamber C than the step 13c is. As such, the communication hole 13a consists of a small-diameter portion located closer to the combustion chamber C than the step 13b is and having a smaller inner diameter, a medium-diameter portion located outside relative to the step 13b and closer to the combustion chamber C than the step 13c is and having an inner diameter larger than the small-diameter portion, and a large-diameter portion located outside relative to the step 13c and having an inner diameter larger than the medium-diameter portion. The pressure detection device 1 is attached to the internal combustion engine 10 by inserting the leading end of the pressure detection device 1 into the communication hole 13a and securing the pressure detection device 1 to the cylinder head 13. The cylinder block 11, the piston 12, and the cylinder head 13 constituting the internal combustion engine 10 are made of a conductive metal material such as cast iron and aluminum.

Figure 2:
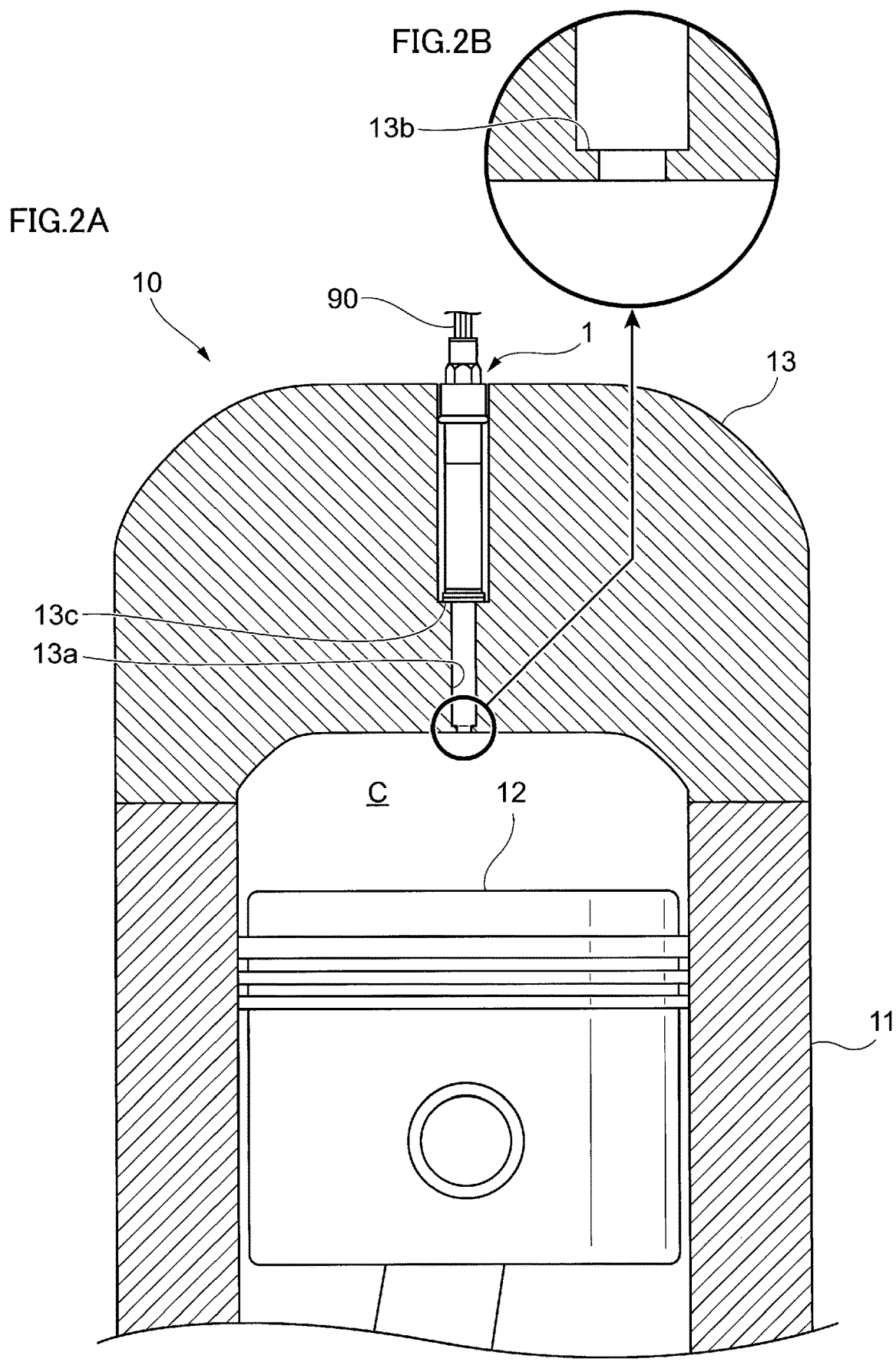
FIG. 2A illustrates a schematic configuration of the pressure detection device as mounted in an internal combustion engine.
FIG. 2B is an enlarged view of an area around a step.

The pressure detection device 1 is attached to the above configured internal combustion engine 10 such that the left side of the pressure detection device 1 in FIG. 1 (buffer member 80 side) faces the combustion chamber C (bottom side in FIG. 2) and the right side of the pressure detection device 1 in FIG. 1 (connecting cable 90 side) faces the outside (top side in FIG. 2). In the following description, the leftward side of the pressure detection device 1 in FIG. 1 is referred to as the "leading end" thereof, and the rightward side of the pressure detection device 1 in FIG. 1 is referred to as the "trailing end" thereof. The direction of an axis along the centerline is referred to as the "axial direction." The direction along a radius of the pressure detection device 1 is referred to as the "radial direction." When referring to the radial direction, the direction toward the centerline of the pressure detection device 1 indicated by a dashed-and-dotted line in FIG. 1 and other figures is referred to as "inside" and the direction away from the centerline is referred to as "outside." In the present embodiment, the "leading end" and the "trailing end" correspond to the "one end" and the "other end," respectively.
(Enclosure Assembly Configuration)

The enclosure assembly 30 as an example of the body includes a leading end external enclosure 31, a diaphragm head 32 attached to the leading end of the leading end external enclosure 31, an intermediate external enclosure 33 attached to the trailing end of the leading end external enclosure 31, and a trailing end external enclosure 34 attached to the trailing end of the intermediate external enclosure 33. The enclosure assembly 30 further includes a first internal enclosure 35 disposed within the leading end external enclosure 31 and attached to the trailing end of the diaphragm head 32, and a second internal enclosure 36 disposed within the leading end external enclosure 31 and attached to the trailing end of the first internal enclosure 35.
<Leading End External Enclosure>

The leading end external enclosure 31 is a hollow and generally cylindrical member. The leading end external enclosure 31 is made of a conductive metal material with high heat and acid resistance, such as stainless steel. Examples of such metal materials include SUS630, known as a precipitation hardening stainless steel, and SUH660, known as an austenitic heat-resistant steel (heat-resistant alloy). However, any of various other metals or alloys (various stainless steels, various heat-resistant steels or various heat-resistant alloys) that satisfy the required characteristics may be employed.

The portion of the leading end external enclosure 31 to be inserted into the communication hole 13a has a constant outer diameter that is substantially the same as the inner diameter of the medium-diameter portion of the communication hole 13a close to the combustion chamber C. The leading end external enclosure 31 is provided at its trailing end with an overhang 311 having an outer diameter larger than the inner diameter of the medium-diameter portion of the communication hole 13a. When the pressure detection device 1 is mounted on the cylinder head 13, the overhang 311 of the leading end external enclosure 31 abuts the step 13c in the communication hole 13a via a first sealing member 71. A leading end surface of the overhang 311 is referred to as a seating surface 312.

The leading end external enclosure 31 is provided with male threads (not shown) on its outer circumferential surface. In addition, the communication hole 13a in the cylinder head 13 shown in FIG. 2 is provided with female threads (not shown) on its inner wall, which can threadably engage the above male threads provided on the leading end external enclosure 31. The communication hole 13a is provided with the step 13b in its portion that is closer to the leading end than its portion provided with the above female threads is. The leading end (buffer member 80) of the pressure detection device 1 abuts this step.

<Diaphragm Head>

The diaphragm head 32 as an example of the pressure receiving member is a generally disk-like member. The diaphragm head 32 is made of a conductive metal material with high heat and acid resistance, such as stainless steel. Examples of such metal materials include SUS630, known as a precipitation hardening stainless steel, and SUH660, known as an austenitic heat-resistant steel (heat-resistant alloy). However, any of various other metals or alloys (various stainless steels, various heat-resistant steels or various heat-resistant alloys) that satisfy the required characteristics may be employed. In this example, the diaphragm head 32 is made of the same material as the leading end external enclosure 31 (e.g., SUS630).

The diaphragm head 32 includes a pressure membrane 32a and a front side central recess 32b, which are an example of the pressure receiving portion, at the center of its leading end, where the pressure membrane 32a and the front side central recess 32b undergo pressure-dependent displacement by being exposed to the outside (toward the combustion chamber C). The diaphragm head 32 also includes a rear side annular recess 32c formed by annularly cutting away a portion of the rear surface opposite the pressure membrane 32a, and a rear side central protrusion 32d protruding from the center of the pressure membrane 32a (where the front side central recess 32b is formed) toward the trailing end as a result of the presence of the rear side annular recess 32c.

The diaphragm head 32 further includes a rear side annular protrusion 32e located in the trailing end around the periphery of the pressure membrane 32a, and a front side annular protrusion 32g, which is an example of the pressure receiving support portion, protruding from the entire periphery of the pressure membrane 32a toward the leading end. The front side annular protrusion 32g is located opposite the rear side annular protrusion 32e (i.e., on the front side). The front side annular protrusion 32g is joined to a portion of a first buffer member 81 of the buffer member 80 (described below) or integrally molded with the first buffer member 81. From another perspective, the leading end of the diaphragm head 32 can be viewed as having the front side annular protrusion 32g and the pressure membrane 32a formed by circularly cutting away a central portion of the leading end of the diaphragm head 32, and the front side central recess 32b formed by further cutting away a central portion of the pressure membrane 32a.

The diaphragm head 32 is disposed to close a leading end opening of the leading end external enclosure 31. More specifically, a portion of the leading end of the leading end external enclosure 31 abuts the rear side annular protrusion 32e of the diaphragm head 32. The diaphragm head 32 and the leading end external enclosure 31 are laser-welded at their interface around the entire outer circumference. The diaphragm head 32 of the present embodiment functions as a spring as the area around the rear side annular recess 32c, which is the thinnest portion thereof, is displaced in response to external forces. The diaphragm head 32 vibrates as it receives pressure (external pressure) from the combustion chamber C and the like.

<Intermediate External Enclosure>

The intermediate external enclosure 33 is a hollow and generally cylindrical member. The intermediate external enclosure 33 is made of a conductive metal material with high heat and acid resistance, such as stainless steel. Examples of such metal materials include SUS430LX, known as a ferritic stainless steel. However, any of various other metals or alloys (various stainless steels, various heat-resistant steels or various heat-resistant alloys) that satisfy the required characteristics may be employed. In this example, the intermediate external enclosure 33 is made of a different material (e.g., SUS430LX) from the leading end external enclosure 31. The leading end of the intermediate external enclosure 33 is adapted to fit into the trailing end of the leading end external enclosure 31. The intermediate external enclosure 33 and the leading end external enclosure 31 are laser-welded at their interface around the entire outer circumference.

<Trailing End External Enclosure>

The trailing end external enclosure 34 is a hollow and generally cylindrical member. The trailing end external enclosure 34 is made of a conductive metal material with high heat and acid resistance, such as stainless steel. Examples of such metal materials include SUS430LX, known as a ferritic stainless steel. However, any of various other metals or alloys (various stainless steels, various heat-resistant steels or various heat-resistant alloys) that satisfy the required characteristics may be employed. In this example, the trailing end external enclosure 34 is made of the same material (e.g., SUS430LX) as the intermediate external enclosure 33. The leading end of the trailing end external enclosure 34 is adapted to fit into the trailing end of the intermediate external enclosure 33. The trailing end external enclosure 34 and the intermediate external enclosure 33 are laser-welded at their interface around the entire outer circumference.

(Detection Mechanism Assembly Configuration)

The detection mechanism assembly 40 includes a conducting member 47, a retaining member 48, a second coil spring 54, a first housing member 55, a second housing member 56, a circuit-embedded member 57, a connecting member 58, a closing member 59, and a third insulating member 60. The detection mechanism assembly 40 further includes a piezoelectric element 41 including a piezoelectric body that demonstrates piezoelectric behavior of a longitudinal piezoelectric effect. The detection mechanism assembly 40 further includes a leading end electrode member 42, a trailing end electrode member 44, and a support member 53, each of which is made of a conductive metal material. The detection mechanism assembly 40 further includes a leading end insulating member 43, a trailing end insulating member 45, a first insulating member 51, and a second insulating member 52, each of which is made of an insulating ceramic material.

The detection mechanism assembly 40 further includes a first coil spring 46 that expands and contracts in the axial direction, a pressure member 49 that functions as a spring by expanding and contracting in its side on the leading end, which is the thinnest portion thereof, in response to external forces, and an insulating tube 50 that functions to integrate (modularize) the leading end electrode member 42, the piezoelectric element 41, the trailing end electrode member 44, and the trailing end insulating member 45 together with the insulating tube 50 by accommodating and securing these components in a contacting relationship.

<Conducting Member>

The conducting member 47 is a generally rod-like member and disposed inside the leading end external enclosure 31. The conducting member 47 is made of a conductive metal material, such as brass, and gold-plated on its surface. The conducting member 47 includes a leading end rod-like portion 471 located in the leading-most position, an intermediate rod-like portion 472 in a trailing position relative to the leading end rod-like portion 471, and a trailing end rod-like portion 473 in a trailing position relative to the intermediate rod-like portion 472. In the conducting member 47, the trailing end rod-like portion 473 has the largest outer diameter, followed by the intermediate rod-like portion 472, then by the leading end rod-like portion 471.

<Retaining Member>

The retaining member 48 is a hollow and generally cylindrical member. The retaining member 48 is made of a synthetic resin material with insulating properties such as polyphenylene sulfide (PPS) or polypropylene terephthalate (PPT). The retaining member 48 includes a leading end portion located in the leading-most position, an intermediate portion in a trailing position relative to the leading end portion, and a trailing end portion in a trailing position relative to the intermediate portion. In the retaining member 48, the trailing end portion has the largest outer diameter, followed by the intermediate portion, then by the leading end portion. The retaining member 48 is disposed in both interiors of the leading end external enclosure 31 and the intermediate external enclosure 33. The retaining member 48 accommodates and retains the above conducting member 47.

<Second Coil Spring>

The second coil spring 54 is a generally helical member and adapted to expand and contract in the centerline direction. The second coil spring 54 is made of a conductive metal material with high heat resistance, such as phosphor bronze, and gold-plated on its surface. In this example, the second coil spring 54 is made of the same material as the first coil spring (e.g., phosphor bronze). The second coil spring 54 is disposed inside the leading end external enclosure 31.

<First Housing Member>

The first housing member 55 is a hollow and generally cylindrical member. The first housing member 55 is made of a conductive metal material, such as brass or stainless steel, and gold-plated on its surface. The first housing member 55 is disposed inside the leading end external enclosure 31.

<Second Housing Member>

The second housing member 56 is a hollow and generally cylindrical member. As with the first housing member 55, the second housing member 56 is made of a conductive metal material, such as brass or stainless steel, and gold-plated on its surface. The second housing member 56 is disposed in both interiors of the leading end external enclosure 31 and the intermediate external enclosure 33.

<Circuit-Embedded Member>

As shown in FIG. 3, the circuit-embedded member 57 includes a circuit board 571 that applies various types of processing using electronic circuitry to electrical signals based on small electric charges output from the piezoelectric element 41, and an encapsulating portion 572 that encapsulates the circuit board 571 by accommodating it therein. The circuit-embedded member 57 is disposed inside the intermediate external enclosure 33, with almost the entirety of the circuit-embedded member 57, except for the trailing end thereof, being disposed inside the second housing member 56. In particular, the circuit board 571 in its entirety is disposed inside the second housing member 56. The leading end of the circuit-embedded member 57 is adapted to fit into a recess in the trailing end of the retaining member 48. A metal plate (electrode terminal) provided on the leading end of the circuit-embedded member 57 is adapted to connect to the trailing end of the conducting member 47. Additionally, a metal plate (electrode terminal) provided on the outer circumferential surface of the circuit-embedded member 57 is adapted to contact the inner circumferential surface of the second housing member 56.

<Connecting Member>

The connecting member 58 is a generally columnar member. The connecting member 58 includes a base member made of a synthetic resin material with insulating properties, such as PPS or PPT, and wires and terminals made of a conductive metal material, such as copper. The connecting member 58 is disposed in both interiors of the intermediate external enclosure 33 and the trailing end external enclosure 34. The portion of the connecting member 58 that confronts the intermediate external enclosure 33 or the trailing end external enclosure 34 (i.e., the outer circumferential surface of the connecting member 58) is made of a synthetic resin material, so that no metal material is exposed in this portion. The leading end of the connecting member 58 confronts the trailing end of the circuit-embedded member 57, and a metal plate (electrode terminal) provided on the circuit-embedded member 57 is adapted to fit into the terminal provided in the connecting member 58. The trailing end of the connecting member 58 allows for insertion therein of respective conductor portions exposed on the leading ends of a power line 91, a signal line 92, and a ground line 93 (their details are described below), which constitute the connecting cable 90. The intermediate external enclosure 33 and the connecting member 58 are integrated by press-fit (interference fit).

<Closing Member>

The closing member 59 is a generally columnar member. However, the closing member 59 is formed with three through-holes along the centerline direction. The closing member 59 is made of a rubber material with insulating properties. The closing member 59 has its leading end disposed inside the trailing end external enclosure 34 and has its trailing end protruding outward relative to the trailing end of the trailing end external enclosure 34. The leading end of the closing member 59 confronts the trailing end of the connecting member 58. The power line 91, the signal line 92, and the ground line 93 described above are inserted into the three through-holes in the closing member 59. The trailing end external enclosure 34 and the closing member 59 are integrated by press-fit (interference fit).

<Third Insulating Member>

The third insulating member 60 is a hollow and generally cylindrical member. However, the third insulating member 60 has a structure that integrates a cylindrical portion in a leading position and an annular portion in a trailing position. The third insulating member 60 is made of a synthetic resin material with insulating properties, such as PPS. The third insulating member 60 is disposed in both interiors of the leading end external enclosure 31 and the intermediate external enclosure 33.

(Sealing Portion Configuration)

As shown in FIG. 1, the sealing portion 70 includes a first sealing member 71 in a relative leading position and a second sealing member 72 in a relative trailing position.

<First Sealing Member>

The first sealing member 71 is a generally annular member and, in this example, configured with a square ring with a square cross-section. The first sealing member 71 is made of a copper material with high heat and acid resistance and a tin-plated surface. The first sealing member 71 is attached to the outer circumferential surface of the leading end external enclosure 31, which constitutes the enclosure assembly 30. More particularly, the first sealing member 71 is attached to the outer circumferential surface of the leading end external enclosure 31 so as to contact the seating surface 312 of the overhang 311. Since the seating surface 312 is the leading end face of the overhang 311, upon the pressure detection device 1 with the attached first sealing member 71 being mounted on the cylinder head 13, the seating surface 312 faces the step 13c of the communication hole 13a with the first sealing member 71 in between.

<Second Sealing Member>

The second sealing member 72 is a generally annular member and, in this example, configured with an O-ring with a circular cross-section. The second sealing member 72 is made of a synthetic rubber material with high mechanical resilience, such as fluororubber. The second sealing member 72 is attached to the outer circumferential surface of the trailing end external enclosure 34, which constitutes the enclosure assembly 30. The second sealing member 72 serves as a sealing member to prevent entry of water and the like from outside the internal combustion engine 10, and also serves as a damping member to prevent the pressure detection device 1 from vibrating, which may otherwise occur during operation of the internal combustion engine 10 or due to vibrations in the installation environment, and thus hitting the inner surface of the communication hole 13a in the cylinder head 13. Therefore, among the materials with high mechanical resilience, a fluororubber material is particularly suitable for the second sealing member 72 as it has high heat-resistant resilience and provides a long-lasting damping function.

(Buffer Member Configuration)

The buffer member 80 as an example of the temperature reducing member is a generally cylindrical member and disposed in the leading end of the pressure detection device 1. The buffer member 80 is composed of a first buffer member 81 as an example of the first member and a second buffer member 82 as an example of the second member detachably joined to the first member. When the pressure detection device 1 is mounted on the cylinder head 13, the buffer member 80 abuts the step 13b in the communication hole 13a. More specifically, a front surface 811 of the first buffer member 81 (described below) of the buffer member 80 abuts the step 13b in the communication hole 13a.

<First Buffer Member>

The first buffer member 81 comprises a generally hollow cylindrical wall. The first buffer member 81 includes an annular front surface 811 on its leading end and an annular rear surface 812 on its trailing end. The first buffer member 81 also includes an outer circumferential surface 813 and an inner circumferential surface 814 that is provided with female threads. The inner circumferential surface 814 includes a cut-away portion 8141 at its one end that is in a leading position relative to the female threads formed on the inner circumferential surface 814 and connects to the front surface 811. The cut-away portion 8141 has a larger inner diameter than that of the female threads.

The first buffer member 81 is made of a metal material (super heat-resistant alloy) with conductivity and higher heat resistance than the diaphragm head 32. Examples of such metal materials include some kinds of iron-based, Gamma prime precipitation-strengthened super heat-resistant alloys. However, any of various other super heat-resistant alloys that satisfy the required characteristics may be employed. Examples of super heat-resistant alloys that can be used include matrix-reinforced super heat-resistant alloys, carbide precipitation-strengthened super heat-resistant alloys, and Gamma prime precipitation-strengthened super heat-resistant alloys. The super heat-resistant alloys that can be used may be iron-based alloys, nickel-based alloys, or cobalt-based alloys. The first buffer member 81 may be made of a copper alloy material with high thermal conductivity, such as a beryllium copper alloy (JIS C172, hereafter denoted as BeCu). Other choices than BeCu may include admiralty brass (JIS C4430), aluminum brass (JIS C6870), and naval brass (JIS C4640).

<Second Buffer Member>

The second buffer member 82 is a generally columnar member. The second buffer member 82 includes a circular front surface 821 on its leading end and a circular rear surface 822 on its trailing end. The second buffer member 82 includes an outer circumferential surface 823 provided with male threads. The second buffer member 82 includes a collar 8231 on the outer circumferential surface 823 that has a larger outer diameter than the male threads formed on the outer circumferential surface 823. The collar 8231 serves as a screw head of the male thread structure (described below) provided on the outer circumference surface 823. The second buffer member 82 includes multiple columnar through-holes 824 running from the front surface 821 on the leading end to the rear surface 822 on the trailing end. The through-holes 824 are an example of the communication hole that allows combustion gas (an example of the fluid) generated in the combustion chamber C to pass therethrough to supply the combustion gas to the pressure membrane 32a of the diaphragm head 32 by passing through.

As with the first buffer member 81, the second buffer member 82 is made of a metal material (super heat-resistant alloy) with conductivity and higher heat resistance than the diaphragm head 32. Examples of such metal materials include some kinds of iron-based, Gamma prime precipitation-strengthened super heat-resistant alloys. However, any of various other super heat-resistant alloys that satisfy the required characteristics may be employed. Examples of super heat-resistant alloys that can be used include matrix-reinforced super heat-resistant alloys, carbide precipitation-strengthened super heat-resistant alloys, and Gamma prime precipitation-strengthened super heat-resistant alloys. The super heat-resistant alloys that can be used may be iron-based alloys, nickel-based alloys, or cobalt-based alloys. The second buffer member 82 may be made of a copper alloy material with high thermal conductivity, such as a beryllium copper alloy (BeCu). Other choices than BeCu may include admiralty brass (JIS C4430), aluminum brass (JIS C6870), and naval brass (JIS C4640). The material of the first buffer member 81 and the material of the second buffer member 82 may or may not be the same.

<Attachment/Detachment of the Second Buffer Member>

As described above, of the first and second buffer members 81, 82 constituting the buffer member 80, the first buffer member 81 is provided with female threads on the inner circumferential surface 814, and the second buffer member 82 is provided with the mating male threads on the outer circumferential surface 823. This screw mechanism allows the second buffer member 82 to be separated from the first buffer member 81 and allows the separated second buffer member 82 to be threaded with the first buffer member 81 again (i.e., attachment and detachment of the second buffer member 82).

With the first and second buffer members 81, 82 threaded with each other, the front surface 811 of the first buffer member 81 is in a leading position relative to the front surface 821 of the second buffer member 82. The central portion of the leading front surface of the buffer member 80, which is defined by the second buffer member 82, is circular and recessed, and the peripheral portion of the leading end surface, which is defined by the first buffer member 81, is annular and protruding around the entire circumference. The central portion of the trailing rear surface of the buffer member 80, which is defined by the second buffer member 82, is circular and recessed, and the peripheral portion of the trailing rear surface, which is defined by the first buffer member 81, is annular and protruding around the entire circumference.

Although not shown in the figures, the central portion defined by the second buffer member 82 may not be recessed in the leading front surface of the buffer member 80 formed by the threadably engaged first and second buffer members 81, 82; in other words, the central portion and the peripheral portion in the leading front surface of the buffer member 80 may lie flush with each other, or the central portion may be protruding and the peripheral portion may be recessed. Whether the central portion defined by the second buffer member 82 is to be recessed, flush with the peripheral portion, or protruding in the leading front surface of the buffer member 80 formed by the threadably engaged first and second buffer members 81, 82 depends on the axial position of the second buffer member 82 threaded with the first buffer member 81. In other words, it depends on at which axial position the second buffer member 82 screwed into the first buffer member 81 is to be secured. Securing of the second buffer member 82 screwed into the first buffer member 81 is described below.

(Relationship Between the Buffer Member and the Diaphragm Head)

In the present embodiment, the trailing rear surface 812 of the first buffer member 81 of the buffer member 80 and the front side annular protrusion 32g of the diaphragm head 32 are laser-welded and integrated at their interface around the entire outer circumference in the state where the rear surface 812 and the front side annular protrusion 32g are abutted together. Thus, in this example, the diaphragm head 32 and the first buffer member 81 are secured (welded) in contact with each other. However, the trailing rear surface 822 of the second buffer member 82 constituting the buffer member 80 is in a spaced-apart, confronting relationship to the pressure membrane 32a and the front side central recess 32b on the leading end of the diaphragm head 32.

In the pressure detection device 1, the rear surface 822 of the second buffer member 82 of the buffer member 80 confronts the pressure membrane 32a and the front side central recess 32b of the diaphragm head 32 with a predetermined gap. For this purpose, the first buffer member 81 is provided with the cut-away portion 8141, and the second buffer member 82 is provided with the collar 8231. With this configuration, as the second buffer member 82 is threaded into the first buffer member 81, the collar 8231 abuts the cut-away portion 8141, blocking a further screwing-in of the second buffer member 82. This enables the diaphragm head 32 and the second buffer member 82 to confront each other with a predetermined gap. As a result, this prevents degradation of the function of the diaphragm head 32 that may otherwise be caused by the second buffer member 82 contacting the diaphragm head 32.

With the pressure detection device 1 mounted on the cylinder head 13, the first buffer member 81 is in contact with the inner wall of the communication hole 13a. By threading the male threads provided on the leading end external enclosure 31 of the pressure detection device 1 into the female threads on the communication hole 13a, the side wall of the leading end external enclosure 31 and the inner wall of the communication hole 13a are brought into contact with each other. The side wall of the leading end external enclosure 31 and the inner wall of the communication hole 13a are in contact with each other as well even in a configuration where the central portion defined by the second buffer member 82 in the leading end surface of the buffer member 80 formed by the threadably engaged first and second buffer members 81, 82 is not recessed.

The relationship between the material of the buffer member 80 and the material of the diaphragm head 32 will now be described. In the present embodiment, each of the buffer member 80 and the diaphragm head 32 is made of an alloy material. However, the buffer member 80 and the diaphragm head 32 are made of different alloy materials. An iron-based alloy (steel) is preferably used for the buffer member 80 and the diaphragm head 32. Stainless steel containing 10.5% or more Cr is preferably used for the diaphragm head 32. On the other hand, an iron-based alloy (super heat-resistant alloy) that is not stainless steel is preferably used for the buffer member 80. A copper alloy may also be used for the buffer member 80.

The alloy material of the buffer member 80 preferably has a thermal expansion coefficient that is comparable, more preferably identical, to that of the alloy material of the diaphragm head 32. The use of a high thermal conductivity material, such as copper alloy, as the alloy material of the buffer member 80 is less likely to provide a match between the thermal expansion coefficients, but instead is expected to exhibit highly responsive endothermic characteristics with respect to steep temperature changes in the combustion gas.

[Connecting Cable Configuration]

As shown in FIG. 1, the connecting cable 90 includes the twisted power line 91, signal line 92, and ground line 93, and a cover member (not shown) that covers the outer periphery of these power line 91, signal line 92, and ground line 93. Each of the power line 91, the signal line 92, and the ground line 93 includes a conductor portion made of tin-plated soft copper strands, and an insulating portion made of polyethylene (cross-linked polyethylene) or the like having a cross-liked structure reinforced with electron beams or the like. The insulating portion covers and insulates the outer periphery of the conductor portion. The cover member is made of an insulating rubber or resin material. The connecting cable 90 may be provided with a shielding element that shields the power line 91, the signal line 92, and the ground line 93, if necessary.

[Procedure for Mounting the Pressure Detection Device on the Internal Combustion Engine]

Referring to FIG. 2, a procedure for mounting the above configured pressure detection device 1 on the internal combustion engine 10 will now be described. First, the pressure detection device 1 is placed such that its leading end, i.e., the buffer member 80 confronts the communication hole 13a in the cylinder head 13 of the internal combustion engine 10 from outside the internal combustion engine 10. Following this, the leading end of the pressure detection device 1 is inserted into the communication hole 13*a*.

Then, the pressure detection device 1 is rotated clockwise around the axial direction with respect to the cylinder head 13 of the internal combustion engine 10. This operation is preferably performed with a torque wrench. This results in threaded engagement between the female threads on the inner circumferential surface of the communication hole 13*a* in the cylinder head 13 and the male threads on the outer circumferential surface of the leading end external enclosure 31 of the pressure detection device 1, causing the pressure detection device 1 to be screwed into the cylinder head 13. As a result, the buffer member 80 on the leading end of the pressure detection device 1 moves toward the combustion chamber C in the internal combustion engine 10.

Along with such a screwing-in, the leading front surface 811 of the first buffer member 81 of the buffer member 80 in the pressure detection device 1 abuts the step 13*b* in the communication hole 13*a* of the cylinder head 13 in the internal combustion engine 10. Also, the seating surface 312 of the overhang 311 of the leading end external enclosure 31 in the pressure detection device 1 abuts the step 13*c* in the communication hole 13*a* via the first sealing member 71. As a result, the pressure detection device 1 essentially cannot be screwed in any further, but by retightening with a torque wrench, a predetermined axial force (fastening axial force) is applied to the pressure detection device 1 and the cylinder head 13 along the axial direction.

In the pressure detection device 1 of the present embodiment, the first sealing member 71 is made of a material with greater elasticity than the buffer member 80, so that the first sealing member 71 is deformed in response to abutment between the step 13*c* and the pressure detection device 1. Therefore, the position of the pressure detection device 1 relative to the communication hole 13*a* depends on abutment between the step 13*b* and the buffer member 80. The buffer member 80 is configured such that the front surface 811 of the first buffer member 81 is in a leading position relative to the front surface 821 of the second buffer member 82 when the first and second buffer members 81, 82 are threaded with each other. As such, of the portions of buffer member 80, only the first buffer member 81 contacts the communication hole 13*a*. Thus, the second buffer member 82, which is another constituent of the buffer member 80, is not subjected to the axial force for mounting the pressure detection device 1 on the internal combustion engine 10. When the cylinder head 13 is not provided with the step 13*b*, the axial force is applied by the seating surface 312 of the overhang 311 and the threaded portion. The above completes the mounting of the pressure detection device 1 on the internal combustion engine 10, or in other words, the fastening of the pressure detection device 1 to the cylinder head 13.

[Pressure Detection Operation by the Pressure Detection Device]

The pressure detection operation by the pressure detection device 1 will now be described. During operation of the internal combustion engine 10, the pressure generated in the combustion chamber C (combustion pressure) is applied to the pressure membrane 32*a* of the diaphragm head 32. In the pressure detection device 1 of the present embodiment, the buffer member 80 is provided on the leading end of the diaphragm head 32, so that the combustion gas generated in the combustion chamber C passes through the through-holes 824 in the second buffer member 82 of the buffer member 80 before reaching the pressure receiving portion of the diaphragm head 32 (the pressure membrane 32*a* and the front side central recess 32*b*). In other words, the buffer member 80 receives the combustion gas, reduces its temperature during its passing through the through-holes 824, and supplies the temperature-reduced combustion gas to the diaphragm head 32.

Meanwhile, in the diaphragm head 32, the pressure received at the pressure receiving portion is transmitted to the opposite, rear side central protrusion 32*d*, and further from the rear side central protrusion 32*d* to the leading end electrode member 42 via the leading end insulating member 43. The pressure transmitted to the leading end electrode member 42 acts on the piezoelectric element 41 held between the leading end electrode member 42 and the trailing end electrode member 44, and the piezoelectric element 41 generates an electric charge according to the pressure received. The electric charge generated in the piezoelectric element 41 is supplied as a charge signal from the leading end electrode member 42 or the trailing end electrode member 44 to the circuit board 571 via the conductive elements such as the conducting member 47 or the second coil spring 54. The charge signal supplied to the circuit board 571 undergoes various processes in processing circuitry (not shown) mounted on the circuit board 571 to yield an output signal. The output signal from the circuit board 571 is then transmitted to the controller via the wires and terminals of the connecting member 58 and the connecting cable 90.

The combustion gas generated in the combustion chamber C has its heat taken away by the buffer member 80 as it passes through the through-holes 824 in the second buffer member 82 of the buffer member 80. As such, the combustion gas having passed through the buffer member 80 has a lower temperature than it had before passing through the buffer member 80. Specifically, the temperature of the combustion gas reaching the pressure receiving portion of the diaphragm head 32 can be reduced by, for example, 100° ° C. or more as compared to when the pressure detection device 1 is not provided with the buffer member 80.

[Accumulation of Deposits]

Figure 5A:
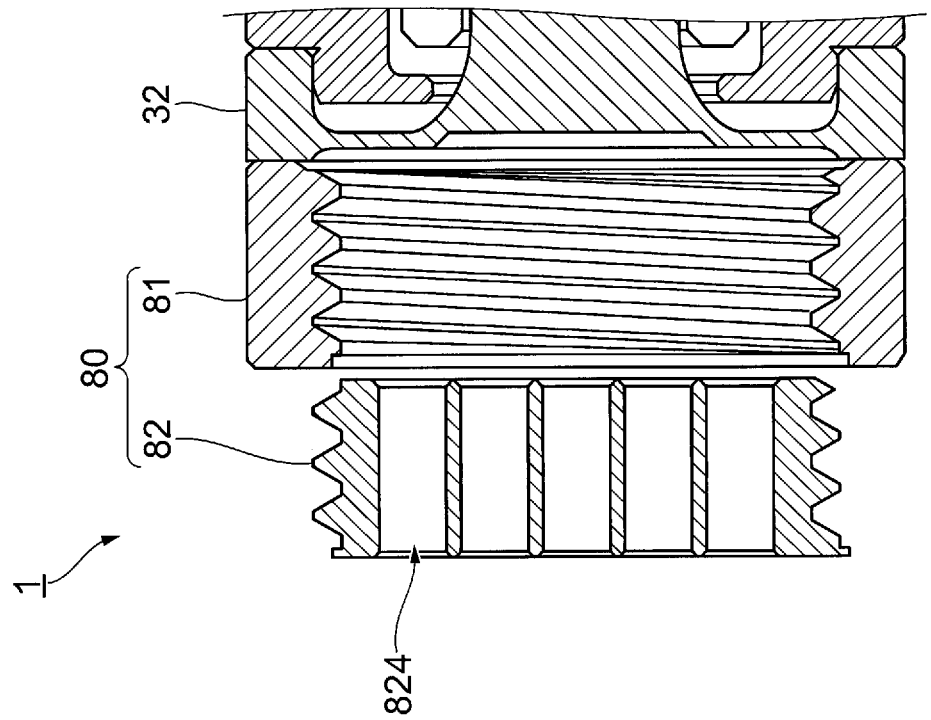
FIG. 5A illustrates accumulation of incomplete combustion products on a buffer member of the pressure detection device.
Figure 5B:
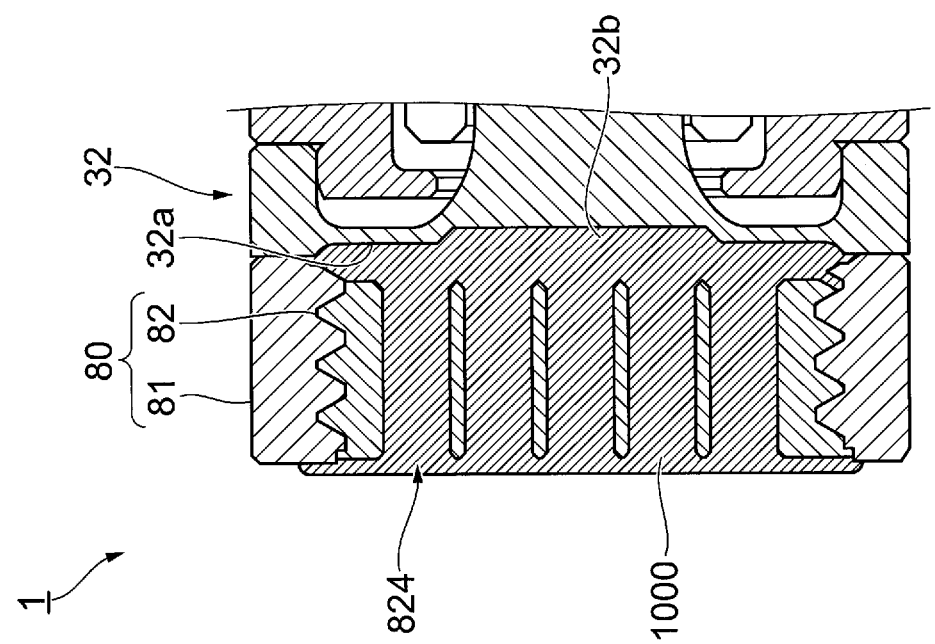
FIG. 5B illustrates removal of a second buffer member from the pressure detection device 1.

FIG. 5A illustrates accumulation of incomplete combustion products (hereinafter referred to as "deposits") on the buffer member 80 of the pressure detection device 1. FIG. 5B illustrates removal of the second buffer member 82 from the pressure detection device 1.

After a certain period of use of the pressure detection device 1, deposits 1000 accumulate on the surfaces of the buffer member 80 and the pressure receiving portion (the pressure membrane 32*a* and front side central recess 32*b*) of the diaphragm head 32. In particular, the deposits are more likely to accumulate in and around the through-holes 824, through which the combustion gas generated in the combustion chamber C passes. The deposits 1000 are periodically removed by an operator because the accumulation of the deposits 1000 may inhibit accurate pressure measurement by the pressure detection device 1.

As described above, the pressure detection device 1 of the present embodiment allows for detachment of the second buffer member 82 including the through-holes 824 in which the deposits 1000 are more likely to accumulate. Thus, the operator periodically removes only the second buffer member 82 from the pressure detection device 1. Specifically, the operator removes the second buffer member 82 threaded with the first buffer member 81 by rotating the second buffer member 82 circumferentially in the screwing-out direction, and washes off the deposits 1000 adhering to the second buffer member 82. The operator then attaches the second buffer member 82, from which the deposits have been removed, to the pressure detection device 1. Specifically, the operator aligns the male threads on the outer circumferential surface 823 of the second buffer member 82 with the female threads on the inner circumferential surface 814 of the first buffer member 81, and rotates the second buffer member 82 circumferentially in the screwing-in direction for threaded engagement. The operator then mounts the pressure detection device 1 on the cylinder head 13 in the manner described above.

[Modification 1]

Depending on the usage of the pressure detection device 1, the second buffer member 82 threaded with the first buffer member 81 in the buffer member 80 may, for some reason, be unintentionally rotated circumferentially in the screwing-out direction. This leads to a displacement of the axial position of the second buffer member 82 relative to the first buffer member 81, with a consequent risk of dislodgement of the second buffer member 82 from the first buffer member 81. Therefore, the buffer member 80 may be provided with a securing mechanism for securing the second buffer member 82 threaded with the first buffer member 81.

Figure 6:
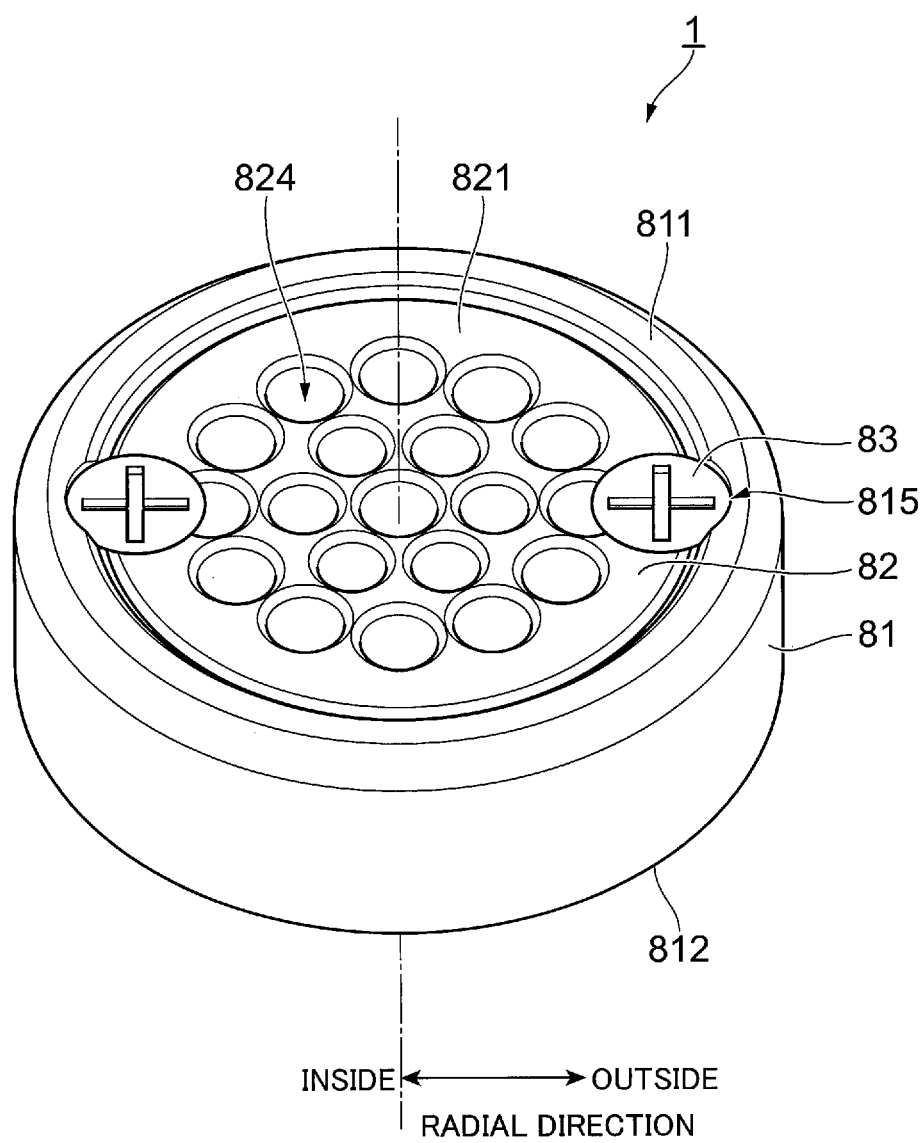
FIG. 6 is a perspective view of an example outer configuration of the buffer member including screws for securing the second buffer member threaded with a first buffer member to the first buffer member.

FIG. 6 is a perspective view of an example outer configuration of the buffer member 80 including screws 83 for securing the second buffer member 82 threaded with the first buffer member 81 to the first buffer member 81. FIG. 7A is a cross-sectional perspective view of the buffer member 80 of FIG. 6 taken in the radial direction. While FIG. 6 shows an example where two screws 83 are provided, FIG. 7A does not show one of the two screws 83 for clarity of illustration. FIG. 7B is a cross-sectional view of the buffer member 80 of FIG. 6 taken in the radial direction.

The buffer member 80 shown in FIGS. 6 through 7B includes a combination of threaded holes formed in threaded engagement portions between the first and second buffer members 81, 82 and the screws 83 threaded into the respective threaded holes, as an example of the securing mechanism for securing of the second buffer member 82 threaded with the first buffer member 81.

The threaded holes for screwing in of the respective screws 83 are formed in the axial direction of the first and second buffer members 81, 82. Specifically, the threaded holes extending in the axial direction are each formed in the portion including respective portions of the leading front surface 811 and the inner circumferential surface 814 of the first buffer member 81 and a portion of the second buffer member 82. Of these, a portion of each threaded hole that is formed in the first buffer member 81 defines a cut-away portion 815 that mates with a portion of a head 831 of the screw 83 threaded into the threaded hole.

Upon screwing in of the screw 83 for securing the second buffer member 82 into the threaded engagement portion between the first and second buffer members 81, 82, a portion of the head 831 of the screw 83 mates with the cut-away portion 815, whereby a threaded portion 832 of the screw 83 is disposed to lie across the first and second buffer members 81, 82. As a result, the head 831 of the screw 83 mated with the cut-away portion 815 and the threaded portion 832 disposed to lie across the first and second buffer members 81, 82 serve as a wedge to prevent unintentional circumferential rotation of the second buffer member 82. This in turn prevents displacement of the second buffer member 82 in the axial direction and dislodgement of the second buffer member 82. In the example shown in FIG. 6, two securing mechanisms each composed of the screw 83 and the threaded hole for screwing in of the screw 83 are disposed at opposite positions across the centerline. The number of securing mechanisms is not limited to two as in this example, and may be one or more than two. When providing multiple securing mechanisms, they are preferably disposed symmetrically with respect to the central axis of the second buffer member 82. For example, when providing three securing mechanisms, the securing mechanisms are disposed at intervals of 120 degrees in the circumferential direction of the buffer member 80 around the central axis. When providing four securing mechanisms, the securing mechanisms are disposed at intervals of 90 degrees in the circumferential direction of the buffer member 80 around the central axis.

FIGS. 7C through 7F illustrate variations in the shape of the head 831 of the screw 83.

The screws 83 shown in FIGS. 7A and 7B above are screws that are generally cylindrical and include the disk-shaped head 831. However, screws of other shapes may be employed, provided that they satisfy the characteristics required as a securing mechanism for securing the second buffer member 82 threaded with the first buffer member 81.

For example, FIGS. 7C and 7D show a plan view and a front view, respectively, of an example outer configuration of the screw 83 with a cylindrical head 831. FIGS. 7E and 7F show a plan view and a front view, respectively, of an example outer configuration of the screw 83 with a head 831 whose side is inclined with respect to the longitudinal direction of the screw 83. The use of the screw 83 with a cylindrical head 831 as a securing mechanism can, by virtue of such a cylindrical shape of the head 831, prevent entry of combustion gas into the threaded hole and consequent sticking of the screw 83 more effectively than using the screw 83 with a head 831 whose side is inclined with respect to the longitudinal direction of the screw 83.

[Modification 2]

Figure 8A:
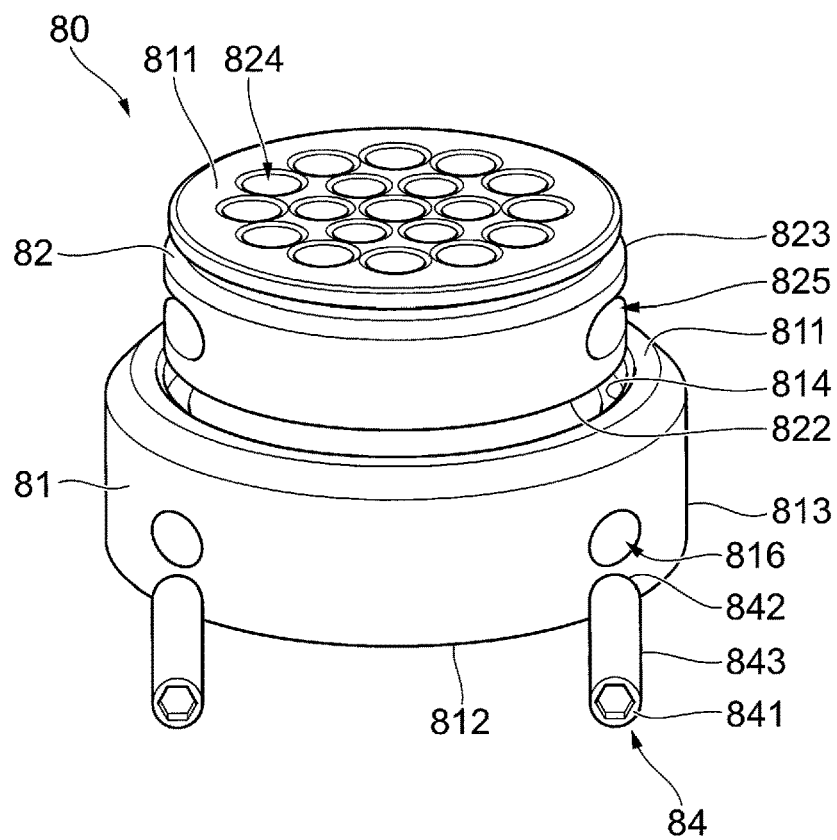
FIG. 8A is a perspective view of an example outer configuration of the buffer member including screws for securing the second buffer member threaded with the first buffer member to the first buffer member.
Figure 8B:
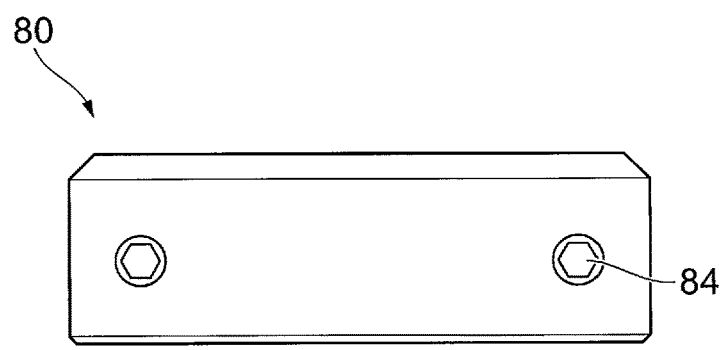
FIG. 8B is a front view of the example outer configuration of the buffer member of FIG. 8A.
Figure 8C:
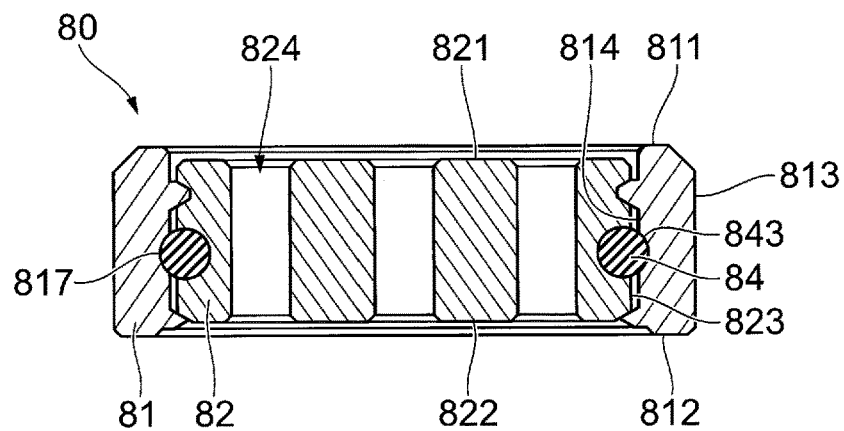
FIG. 8C is a cross-sectional view of the buffer member of FIG. 8A, taken in the radial direction.

FIG. 8A is a perspective view of an example outer configuration of the buffer member 80 including screws 84 for securing the second buffer member 82 threaded with the first buffer member 81 to the first buffer member 81. FIG. 8B is a front view of the example outer configuration of the buffer member 80 of FIG. 8A. FIG. 8C is a cross-sectional view of the buffer member 80 of FIG. 8A, taken in the radial direction.

The buffer member 80 shown in FIGS. 8A through 8C includes a combination of threaded holes formed in the threaded engagement portions between the first and second buffer members 81, 82 and screws 84 threaded with the respective threaded holes, as an example of the securing mechanism for securing the second buffer member 82 threaded with the first buffer member 81.

The threaded holes for screwing in of the respective screws 84 are formed in a direction perpendicular to the axial direction of the first and second buffer members 81, 82. Specifically, the threaded holes 816 extending radially relative to the axial direction in the axial direction are each formed in the portion including respective portions of the outer circumferential surface 813 and the inner circumferential surface 814 of the first buffer member 81 and a portion of the outer circumferential surface 823 of the second buffer member 82. Of these, a portion of each threaded hole 816 that is formed in the inner circumferential surface 814 of the first buffer member 81 defines a cut-away portion 817 that mates with a portion of the screw 84 threaded into the threaded hole 816. Also, a portion of each threaded hole 816 that is formed in the second buffer member 82 defines a cut-away portion 825 that mates with a portion of the screw 84 threaded into the threaded hole 816.

In the example shown in FIG. 8, two securing mechanisms each composed of the screw 84 and the threaded hole 816 for screwing in of the screw 84 are disposed at opposite positions across a predetermined plane that is parallel to and includes the centerline. However, the number of securing mechanisms is not limited to two as in this example, and may be one or more than two. For example, when providing three securing mechanisms, the respective threaded holes 816 are provided at three equally spaced-apart circumferential positions on the outer circumferential surface 813 of the first buffer member 81. Also, when providing four securing mechanisms, the respective threaded holes 816 are preferably provided at four equally spaced-apart circumferential positions on the outer circumferential surface 813 of the first buffer member 81 for arrangement of these securing mechanisms.

Upon screwing in of the screw 84 for securing the second buffer member 82 into the threaded engagement portion between the first and second buffer members 81, 82, a portion of the screw 84 mates with the cut-away portion 817 of the first buffer member 81 and the cut-away portion 825 of the second buffer member 82. As a result, the portion of the screw 84 mated with the cut-away portion 817 of the first buffer member 81 and the cut-away portion 825 of the second buffer member 82 serve as a wedge to prevent unintentional circumferential rotation of the second buffer member 82. This in turn prevents dislodgement of the second buffer member 82 resulting from unintentional circumferential rotation of the second buffer member 82. Additionally, when the threaded holes 816 are provided in a direction perpendicular to the axial direction, the threaded holes 816 will be located farther away from the combustion chamber C of the internal combustion engine 10 than when the threaded holes are provided in the axial direction as in the example in FIG. 6 described above. As such, the threaded holes 816 are not directly exposed to the combustion gas from the combustion chamber C. This reduces the risk of deformation or damage otherwise caused by repeated thermal expansion and contraction of the screws 84, as well as accumulation of the deposits in the threaded holes 816.

The screw 84 shown in FIGS. 8A through 8C is a so-called set screw that has a cylindrical shape with no clear distinction between the head and the body. The screw 84 includes a face 841 on its one longitudinal end for receiving a jig such as a hexagonal wrench, and a face 842 on its other longitudinal end. The screw 84 also includes an outer circumferential surface 843. The outer circumferential surface 843 is provided with male threads (not shown). The inner wall of the threaded hole 816 is provided with female threads (not shown) that can threadably engage the above male threads on the outer circumferential surface 843.

The entire screw 84 is threaded into the threaded hole 816, with no part of the screw 84 protruding outward from the entrance of the threaded hole 816. This prevents the inner wall of the communication hole 13a of the internal combustion engine 10 from being damaged by the screw head otherwise protruding from the outer circumferential surface 813 of the buffer member 181 when mounting the pressure detection device 1 on the internal combustion engine 10. Since the threaded holes 816 are provided in the outer circumferential surface 813 of the first buffer member 81 in the example of FIG. 8, the sealing between the screw 84 and the threaded hole 816 may be disadvantageously reduced, compared to the example using the headed screw as in Modification 1 shown in FIGS. 6 through 7F above. However, the use of a small-diameter set screw as the screw 84 can reduce the risk of such reduced sealing.

[Modification 3]

As described above, the present embodiment enables the detachment of the second buffer member 82, making it possible to efficiently remove the deposits adhering to the second buffer member 82. However, depending on the circumstances, the deposits adhering to the second buffer member 82 may accumulate and get stuck, which may prevent the second buffer member 82 from being rotated well circumferentially in the screwing-out direction.

Figure 9B:
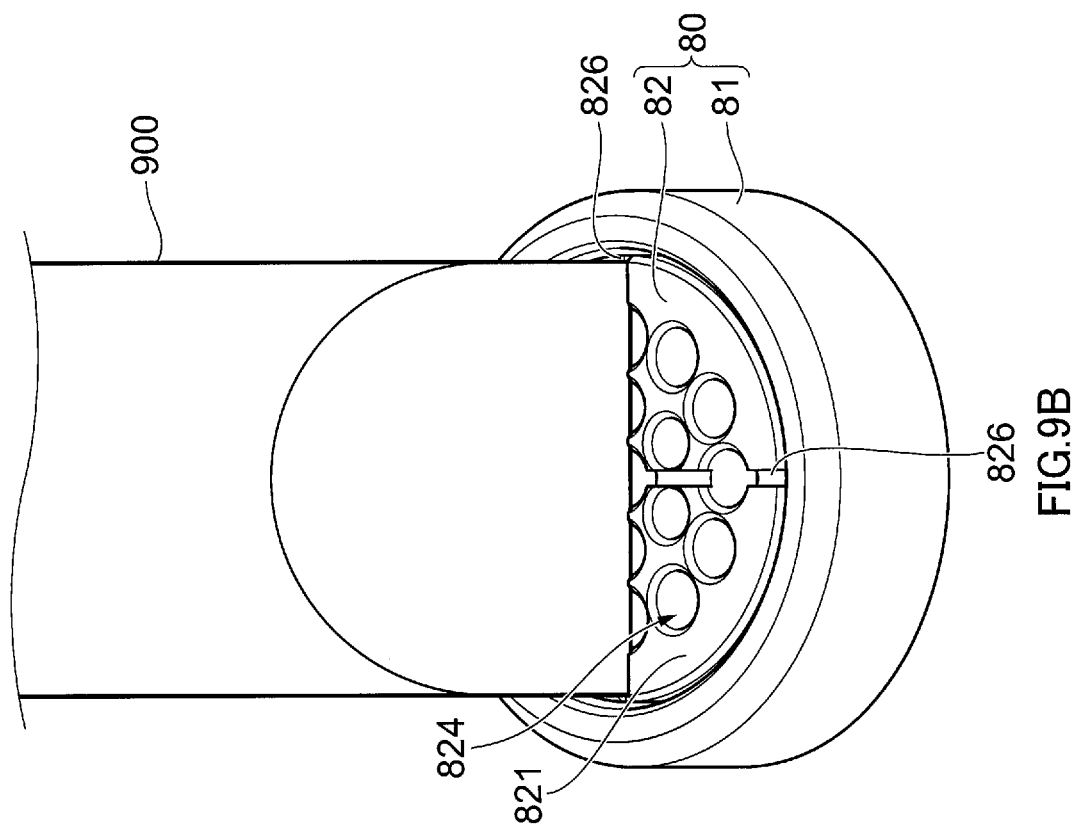
FIGS. 9A and 9B are perspective views of an example outer configuration of the buffer member that allows the second buffer member to be rotated using a jig.
Figure 9A:
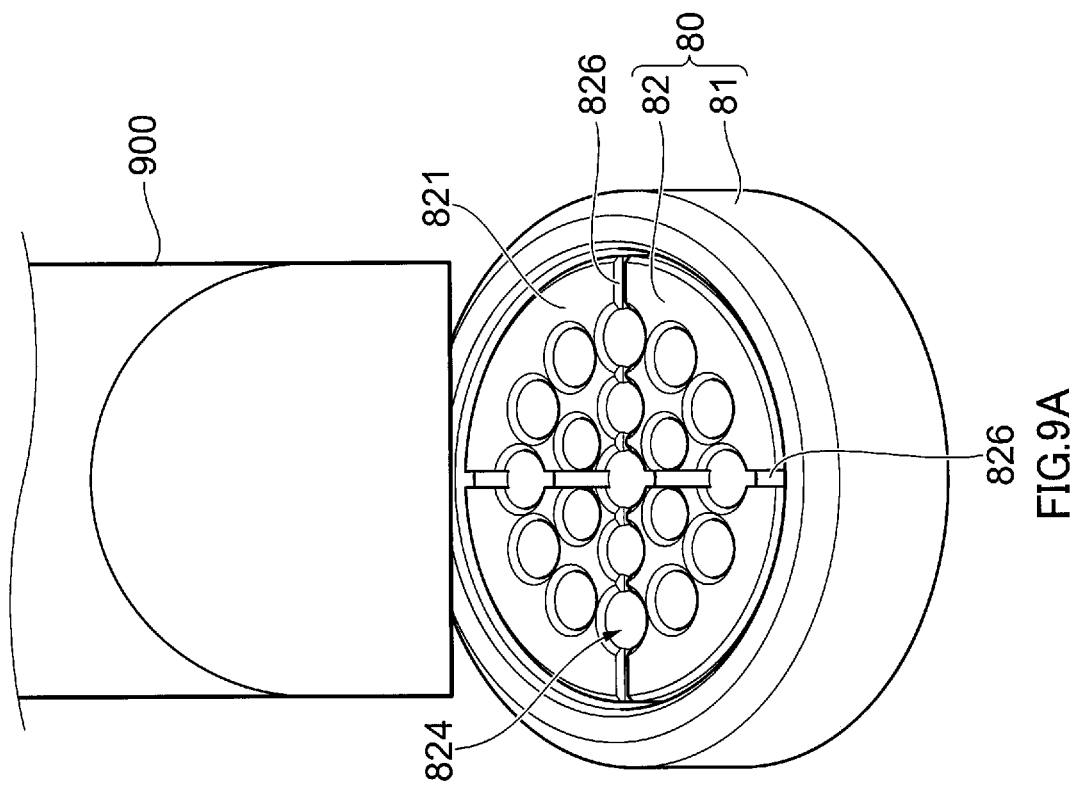

FIGS. 9A and 9B are perspective views of an example outer configuration of the buffer member 80 that allows the second buffer member 82 to be rotated using a jig.

The second buffer member 82 of the buffer member 80 shown in FIGS. 9A and 9B is provided on its leading front surface 821 with two radially extending straight grooves 826 perpendicular to each other. The grooves 826 can receive a jig 900 such as a flathead screwdriver. An operator uses the jig 900 to scrape off the deposits until the grooves 826 are exposed, and then inserts the jig 900 into at least one of the exposed grooves 826. This makes it easier to rotate the second buffer member 82 in the circumferential direction.

[Modification 4]

As described above, the present embodiment enables the detachment of the second buffer member 82, making it possible to efficiently remove the deposits adhering to the second buffer member 82. However, depending on the circumstances, even when the second buffer member 82 is removed from the first buffer member 81, the through-holes 824 may be clogged with deposits, which may be hard to remove even by washing.

Figure 10B:
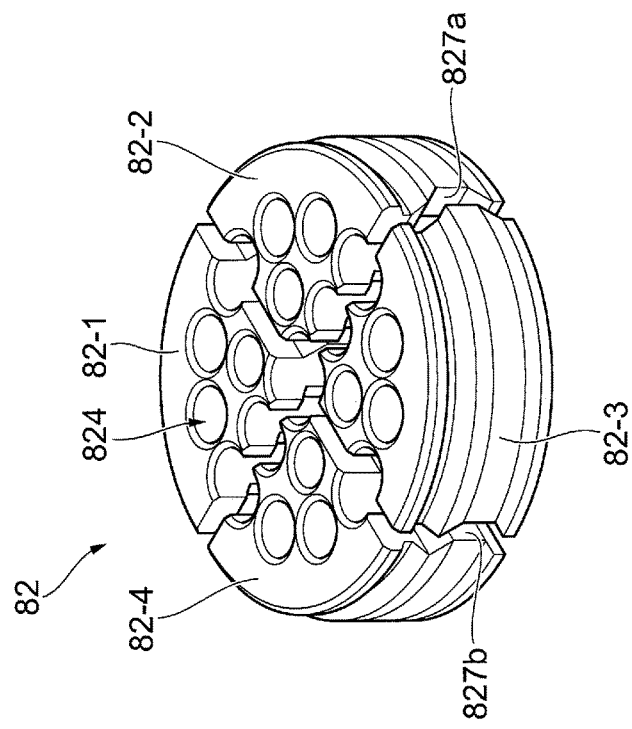
FIGS. 10A and 10B are perspective views of an example outer configuration of the second buffer member that can be separated into multiple sub-members and assembled from the separated multiple sub-members.
Figure 10A:
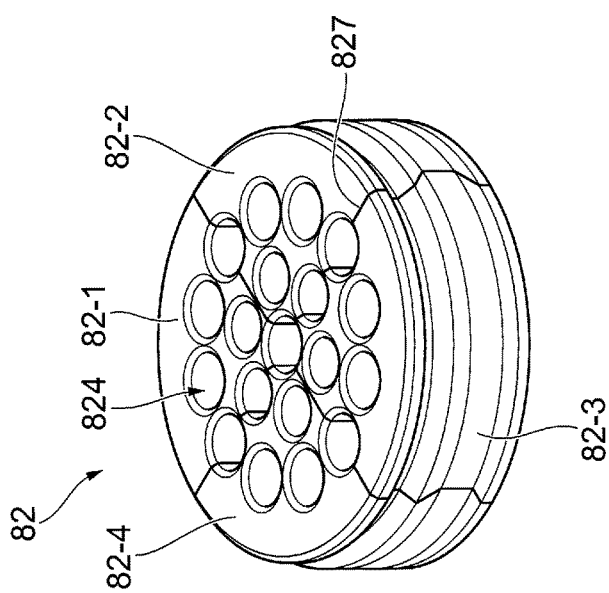

FIGS. 10A and 10B are perspective views of an example outer configuration of the second buffer member 82 that can be separated into multiple sub-members and assembled from the separated multiple sub-members.

FIG. 10A shows the second buffer member 82 as formed by combining multiple sub-members. FIG. 10B shows the second buffer member 82 as separated into multiple sub-members.

The second buffer member 82 shown in FIG. 10A is formed of combinable sub-members 82-1 through 82-4. Specifically, the sub-member 82-1 is combined with the sub-members 82-2 and 82-4 via joining surfaces 827, and the sub-member 82-2 is combined with the sub-members 82-1 and 82-3 via the joining surfaces 827. The sub-member 82-3 is combined with the sub-members 82-2 and 82-4 via the joining surfaces 827, and the sub-member 82-4 is combined with the sub-members 82-1 and 82-3 via the joining surfaces 827. These combinations result in the second buffer member 82.

The joining surfaces 827 are ones of the surfaces forming each of the sub-members 82-1 through 82-4 that are provided with a recess 827a and a protrusion 827b that are mated during assembly. When assembling the multiple separated sub-members, the recesses 827a and the corresponding protrusions 827b are mated, permitting assembly without misalignment. This also permits assembly without considering the individual positions of the multiple sub-members.

Thus, the second buffer member 82 shown in FIG. 10A can be separated into the sub-members 82-1 through 82-4, which facilitates the removal of deposits adhering to the second buffer member 82. In addition, the separated sub-members 82-1 through 82-4 can be assembled via the joining surfaces 827, so that after removing the deposits via separation into the sub-members 82-1 through 82-4, the sub-members 82-1 through 82-4 can be reassembled and used again as the second buffer member 82. The sub-members 82-1 through 82-4 can have the same shape. This eliminates the need for considering assembly counterparts during assembly. This also facilitates replacement due to damage, etc.

In summary, the pressure detection device 1 according to some embodiments of the present invention may be at least configured as follows, and may be implemented in a variety of embodiments.

That is, the pressure detection device 1 according to some embodiments of the present invention comprises: a body (enclosure assembly 30) configured to be mounted in a communication hole 13a in an internal combustion engine 10; a pressure receiving member (diaphragm head 32) provided at one end of the body and configured to receive pressure of a fluid (combustion gas) from the internal combustion engine 10; and a temperature reducing member (buffer member 80) located at the pressure receiving member on a leading end at the one end of the body and configured to supply the fluid to the pressure receiving member while reducing temperature of the fluid. The pressure receiving member comprises: a pressure receiving portion (pressure membrane (front surface) 32a and front side central recess 32b) configured to be displaced under pressure; and a pressure receiving support portion (front side annular protrusion 32g) threaded or integrally molded with a first member (first buffer member 81), the first member being joined to or integrally molded with the pressure receiving member and including an inner circumferential surface 814. The temperature reducing member comprises: the first member; and a second member (second buffer member 82) having an outer circumferential surface 823 facing the inner circumferential surface 814. Female threads formed on the inner circumferential surface 814 of the first member and male threads formed on the outer circumferential surface 823 of the second member are configured to threadably engage each other.

Since the temperature reducing member that supplies the fluid from the internal combustion engine 10 to the pressure receiving member is composed of the first member joined to or integrally molded with the pressure receiving member and the second member threaded with the first member, the second member is detachable. This facilitates removal of the deposits 1000 adhering to the temperature reducing member. In addition, in the configuration where the axial force is not applied to the second member when it is threaded with the first member, the effect of the attachment/detachment of the second member on the sealing between the pressure detection device and the internal combustion engine can be reduced.

The first member may be integrally molded with the pressure receiving support portion.

Such integral molding of the first member and the pressure receiving support portion increases the sealing between the first member and the pressure receiving support portion.

The second member may comprise a plurality of communication holes (through-holes 824) configured to allow the fluid to be supplied to the pressure receiving portion.

The deposits 1000 are more likely to accumulate in the communication holes of the second member, which is detachable by virtue of the screw mechanism. Thus, the second member can be removed and washed, etc., to remove the deposits efficiently.

The second member threaded with the first member may be located at a position where the second member does not contact the pressure receiving member.

Disposing the second member threaded with the first member at a position where it does not contact the pressure receiving member can prevent the degradation of the function of the pressure receiving member that may otherwise be caused by the second member contacting the pressure receiving member.

The pressure detection device may further comprise a securing mechanism configured to secure the second member threaded with the first member.

Securing the second member threaded with the first member can prevent unintentional dislodgement of the second member.

The securing mechanism may comprise a combination of a threaded hole formed in a threaded engagement portion between the first member and the second member and a screw (e.g., screws 83, 84) configured to be threaded into the threaded hole.

This configuration, where the screw for securing the second member is threaded into the threaded engagement portion between the first and second members, can prevent the dislodgement of the second member that may otherwise result from unintentional rotation of the second member.

The threaded hole may be formed in the axial direction of the first member and the second member, and the first member may comprise a cut-away portion configured to mate with a portion of a head 831 of the screw (e.g., screw 83) threaded into the threaded hole.

This configuration, where the first member includes a cut-away portion that mates with a portion of the head 831 of the screw of the securing mechanism, can prevent the dislodgement of the second member that may otherwise result from unintentional rotation of the second member.

The head 831 of the screw may be of a cylindrical shape (e.g., screw 83 in FIGS. 7C and 7D).

By virtue of the screw as the securing mechanism having the cylindrical head 831, entry of the supplied fluid into the threaded hole can be blocked more effectively than when the screw has a head 831 whose side is inclined with respect to the longitudinal direction of the screw (e.g., screw 83 in FIGS. 7E and 7F).

The threaded hole may be formed in a direction perpendicular to the axial direction of the first member and the second member (e.g., threaded hole 816 in FIG. 8A).

With this configuration, where the threaded hole of the securing mechanism is provided in a direction perpendicular to the axial direction of the first and second members, the threaded hole is located farther from the combustion chamber of the internal combustion engine than when the threaded hole is provided in the axial direction of the first and second members (for example, the threaded hole into which the screw 83 is threaded in FIG. 6). This reduces the risk of deformation or damage otherwise caused by repeated thermal expansion and contraction of the screw, as well as accumulation of the deposits in the threaded hole.

The head of the screw (e.g., part of screw 84 in FIG. 8A) threaded into the threaded hole may be configured not to protrude from an entrance of the threaded hole (e.g., threaded hole 816 in FIG. 8A).

This configuration, where the head of the screw threaded into the threaded hole of the securing mechanism does not protrude outward from the opening of the screw hole, can prevent the inner wall of the hole in the internal combustion engine from being damaged by the screw head when mounting the pressure detection device on the internal combustion engine.

The second member may comprise at least one straight groove 826 on its leading end surface.

This configuration, where a straight groove 826 is provided on the leading end surface of the second member prone to accumulation of the deposits 1000, facilitates scraping off the deposits 1000 by insertion of a jig 900 into the groove 826.

The second member may be configured to be separated into a plurality of sub-members (e.g., sub-members 82-1 through 82-4) and assembled from the plurality of separated sub-members.

This configuration, where the second member can be separated into multiple sub-members, facilitates removal of the deposits 1000 adhering to the second member. In addition, this configuration allows for assembling the separated multiple sub-members together, which allows them to be reassembled and used again as the second member after removal of the deposits 1000 via separation into the multiple sub-members.

Each of the separated multiple sub-members may comprise a recess and a protrusion (e.g., joining surfaces 827 in FIG. 10A) used for mating during assembly.

When assembling the multiple separated sub-members, the recess and the corresponding protrusion are mated, permitting assembly without misalignment. This configuration also permits assembly without considering the individual positions of the multiple sub-members.

[Other Modifications]

In the above embodiment, nineteen cylindrical through-holes 824 are provided in the second buffer member 82 of the buffer member 80. However, this is not limiting. In other words, the shape, number, dimensions, and arrangement of the through-holes 824 may be modified as needed, provided that the buffer member 80 can reduce the temperature of the combustion gas as it passes through the buffer member 80.

In FIG. 6, the cross-head screws as the screws 83 are disposed at two opposing positions across the centerline. However, this is not limiting. In other words, the shape, dimensions, and arrangement of the screws 83 can be modified as needed, provided that the screws 83 can serve as the securing mechanism. For example, the screw 83 may be a set screw with a hexagonal bore, rather than the cross-head screw. When configured as a set screw with a hexagonal bore, the screw can have a reduced head diameter.

FIG. 10 illustrates the second buffer member 82 as being separated into the four sub-members. However, this is not limiting. In other words, the second buffer member 82 separated into any n sub-members (where n is an integer of two or greater) can be employed, as it is only required to be capable of being separated into multiple sub-members and assembled therefrom.

In the above embodiment, the central portion defined by the second buffer member 82 in the trailing rear surface of the buffer member 80 as formed by the threaded engagement of the first and second buffer members 81, 82 is recessed. However, this is not limiting. In other words, the central portion defined by the second buffer member 82 in the trailing rear surface of the buffer member 80 as formed by the threaded engagement of the first and second buffer members 81, 82 may not be recessed, or in other words, the central portion and the peripheral portion in the trailing rear surface of the buffer member 80 may lie flush with each other.

Although the present embodiment has been described above, the technical scope of the present invention is not limited to the above described embodiment. Various modifications and configuration alternatives that do not depart from the scope of the technical concept of the present invention are encompassed by the present invention. While the above embodiment discussed employing the piezoelectric element 41 in the detection mechanism assembly 40 of the pressure detection device 1, the configuration of the detection mechanism assembly 40 may be replaced with any of various conventionally known detection mechanisms. For example, a strain gauge or the like may be used instead of the piezoelectric element 41. When using a strain gauge, it is necessary to provide the pressure detection device with a power line for power supply to the strain gauge, in addition to the components in the above embodiment.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art without departing from the scope and spirit of the present invention. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pressure detection device comprising:
   a body configured to be mounted in a hole in an internal combustion engine;
   a pressure receiving member provided at one end of the body and configured to receive pressure of a fluid from the internal combustion engine;
   a temperature reducing member located at the pressure receiving member on a leading end at the one end of the body and configured to supply the fluid to the pressure receiving member while reducing temperature of the fluid, wherein
   the pressure receiving member comprises:
      a pressure receiving portion configured to be displaced under pressure; and
      a pressure receiving support portion joined to or integrated with a first member, the first member being joined to or integrated with the pressure receiving member and having an inner circumferential surface,
   the temperature reducing member comprises:
      the first member; and
      a second member having an outer circumferential surface facing the inner circumferential surface, and
   female threads formed on the inner circumferential surface of the first member and male threads formed on the outer circumferential surface of the second member are configured to threadably engage each other; and
   a securing mechanism configured to secure the second member threaded with the first member,
   wherein the securing mechanism comprises a combination of a threaded hole formed in the first member and the second member and a screw configured to be threaded into the threaded hole.

2. The pressure detection device according to claim 1, wherein the first member is integrally molded with the pressure receiving support portion.

3. The pressure detection device according to claim 1, wherein the second member comprises a plurality of communication holes configured to allow the fluid to be supplied to the pressure receiving portion.

4. The pressure detection device according to claim 1, wherein the second member threaded with the first member is located at a position where the second member does not contact the pressure receiving member.

5. The pressure detection device according to claim 1, wherein
the threaded hole is formed in an axial direction of the first member and the second member, and
the first member comprises a cut-away portion configured to mate with a portion of a head of the screw threaded into the threaded hole.

6. The pressure detection device according to claim 5, wherein the head of the screw is of a cylindrical shape.

7. The pressure detection device according to claim 1, wherein the threaded hole is formed in a direction perpendicular to an axial direction of the first member and the second member.

8. The pressure detection device according to claim 7, wherein a head of the screw threaded into the threaded hole is configured not to protrude from an entrance of the threaded hole.

9. A pressure detection device comprising:
a body configured to be mounted in a hole in an internal combustion engine;
a pressure receiving member provided at one end of the body and configured to receive pressure of a fluid from the internal combustion engine; and
a temperature reducing member located at the pressure receiving member on a leading end at the one end of the body and configured to supply the fluid to the pressure receiving member while reducing temperature of the fluid, wherein
the pressure receiving member comprises:
a pressure receiving portion configured to be displaced under pressure; and
a pressure receiving support portion joined to or integrated with a first member, the first member being joined to or integrated with the pressure receiving member and having an inner circumferential surface,
the temperature reducing member comprises:
the first member; and
a second member having an outer circumferential surface facing the inner circumferential surface,
female threads formed on the inner circumferential surface of the first member and male threads formed on the outer circumferential surface of the second member are configured to threadably engage each other, and
the second member comprises at least one straight groove on a leading end surface thereof.

10. A pressure detection device comprising:
a body configured to be mounted in a hole in an internal combustion engine;
a pressure receiving member provided at one end of the body and configured to receive pressure of a fluid from the internal combustion engine; and
a temperature reducing member located at the pressure receiving member on a leading end at the one end of the body and configured to supply the fluid to the pressure receiving member while reducing temperature of the fluid, wherein
the pressure receiving member comprises:
a pressure receiving portion configured to be displaced under pressure; and
a pressure receiving support portion joined to or integrated with a first member, the first member being joined to or integrated with the pressure receiving member and having an inner circumferential surface,
the temperature reducing member comprises:
the first member; and
a second member having an outer circumferential surface facing the inner circumferential surface,
female threads formed on the inner circumferential surface of the first member and male threads formed on the outer circumferential surface of the second member are configured to threadably engage each other, and
the second member is configured to be separated into a plurality of sub-members and assembled from the plurality of separated sub-members.

11. The pressure detection device according to claim 10, wherein each of the plurality of separated sub-members comprises a recess and a protrusion used for mating during assembly.

* * * * *